(12) United States Patent
Edelson

(10) Patent No.: US 10,612,635 B2
(45) Date of Patent: Apr. 7, 2020

(54) WOBBLE GEAR SYSTEM

(71) Applicant: Borealis Technical Limited, North Plains, OR (US)

(72) Inventor: Jonathan S. Edelson, Hillsboro, OR (US)

(73) Assignee: Borealis Technical Limited, Gibraltar (GI)

( * ) Notice: Subject to any disclaimer, the term of this patent is extended or adjusted under 35 U.S.C. 154(b) by 0 days.

(21) Appl. No.: 16/028,351

(22) Filed: Jul. 5, 2018

(65) Prior Publication Data

US 2019/0011027 A1  Jan. 10, 2019

Related U.S. Application Data

(60) Provisional application No. 62/528,581, filed on Jul. 5, 2017.

(51) Int. Cl.
| | |
|---|---|
| *F16H 1/28* | (2006.01) |
| *F16H 35/00* | (2006.01) |
| *F16H 13/08* | (2006.01) |
| *B60K 17/04* | (2006.01) |
| *F16H 57/08* | (2006.01) |
| *B60K 7/00* | (2006.01) |

(52) U.S. Cl.
CPC ........... *F16H 35/00* (2013.01); *B60K 7/0007* (2013.01); *B60K 17/046* (2013.01); *F16H 1/28* (2013.01); *F16H 13/08* (2013.01); *F16H 57/08* (2013.01); *F16H 2035/001* (2013.01)

(58) Field of Classification Search
CPC . F16H 35/00; F16H 1/28; F16H 13/08; F16H 57/08; F16H 2035/001; B60K 7/0007; B60K 17/046
See application file for complete search history.

(56) References Cited

U.S. PATENT DOCUMENTS

| | | | |
|---|---|---|---|
| 5,024,114 A | 6/1991 | Guttinger | |
| 5,286,236 A * | 2/1994 | Hosokawa | ............... F16H 25/06 475/168 |
| 6,657,334 B1 | 12/2003 | Edelson | |
| 6,838,791 B2 | 1/2005 | Edelson | |
| 7,116,019 B2 | 10/2006 | Edelson | |
| 7,445,178 B2 | 11/2008 | McCoskey et al. | |

(Continued)

FOREIGN PATENT DOCUMENTS

EP          1200754 A1     5/2002

*Primary Examiner* — David J Hlavka

(57) ABSTRACT

A wobble gear system is provided with an arrangement of gear elements that permits a motive input to drive planet gear elements to increase the gear reduction ratio while maximizing efficiency of the wobble gear system. The wobble gear system may have eccentrically rotating or oscillating wobble elements including a wobble plate and compound planet gear elements that are non-collinear and may be driven by the motive input, increasing the realized gear ratio in a single stage without reducing efficiency. One wobble gear system embodiment may employ a plurality of ring-supported and driven compound planet gear elements with laterally offset non-collinear central axes to optimize eccentricity and enhance gear reduction ratios. The wobble gear system may be integrated with components of a vehicle drive wheel driven by an in-wheel motor to produce speeds and torques required to drive vehicles including automobiles and aircraft.

20 Claims, 4 Drawing Sheets

(56) References Cited

U.S. PATENT DOCUMENTS

| | | | | |
|---|---|---|---|---|
| 7,469,858 B2* | 12/2008 | Edelson | ................... | F16H 3/56 |
| | | | | 244/103 S |
| 7,621,838 B2* | 11/2009 | Ogawa | ................... | B62D 5/008 |
| | | | | 475/168 |
| 8,303,450 B2 | 11/2012 | McKinnon | | |
| 9,233,752 B2 | 1/2016 | Walitzki et al. | | |
| 9,783,027 B1* | 10/2017 | Elie | ........................ | E05F 15/00 |
| 9,862,263 B2* | 1/2018 | Tesar | ................... | B60K 7/0007 |
| 2004/0102274 A1* | 5/2004 | Tesar | ........................ | F16H 1/28 |
| | | | | 475/168 |
| 2006/0273686 A1 | 12/2006 | Edelson et al. | | |
| 2007/0249457 A1* | 10/2007 | Tesar | ........................ | F16H 1/28 |
| | | | | 475/180 |
| 2014/0224064 A1* | 8/2014 | Tesar | ................... | H02K 7/116 |
| | | | | 74/606 R |

* cited by examiner

WOBBLE GEAR SYSTEM

PRIORITY CLAIM

This application claims priority from U.S. Provisional Patent Application No. 62/528,587, filed 5 Jul. 2017, the entire disclosure of which is fully incorporated herein.

TECHNICAL FIELD

The present invention relates generally to gear systems and specifically to a gear reduction system that incorporates eccentric gear elements and may be used with motors to power vehicle drive wheels and in other applications.

BACKGROUND OF THE INVENTION

Gear systems that match natural output characteristics of a source of mechanical power with requirements of a load are known. Gearboxes that function to trade speed for torque and vice versa, may be used in a range of applications, for example to permit a high speed, low torque electric motor to move a heavy load slowly or to match the characteristics of a wind turbine.

Planetary gear systems with planet elements that may be carried on a planetary carrier and rotate individually as the planet elements rotate about a central axis and roll against concentric elements have been used in many applications. Mechanical input or output in a planetary gear system may be provided by spinning a concentric gear or a planet carrier. In some planetary gear systems planet elements may be stepped or compound, with each planet element being formed with two different gear surfaces. Each gear surface has a different diameter and is constrained to rotate at the same speed. The different gear surfaces are typically associated with and roll against respective concentric elements. When the diameter of the planet elements is smaller than that of the concentric elements, the planet elements rotate at a higher speed than any of the other elements in the system. Planetary gearing with such stepped or compound planet elements may develop an extremely high gear ratio with only a few gear stages. Planetary gear systems may be constructed with gear system elements that have only toothed elements, known as spur gearing, gear system elements that have smooth surfaces, known as traction gearing, with a combination of toothed and smooth surfaces, and with other types of rotary elements.

In recent years, much effort has been directed toward moving vehicles efficiently on ground surfaces without using fossil fuel-powered or internal combustion engines. Providing one or more vehicle drive wheels that are powered by other sources, typically electric drive motors, can be an effective way to move a vehicle. In U.S. Pat. No. 7,445,178, for example, McCoskey et al. describes electric motors mounted to drive aircraft nose wheels, each of which has a planetary gear system with planetary and sun gears rotated through a ring gear by a rotor of the wheel motor. A harmonic drive designed to be driven by an electric motor and meet the torque and power requirements required in a compact landing gear wheel-mounted drive system capable of driving an aircraft during ground travel is described in commonly owned U.S. Pat. No. 9,233,752 to Walitzki et al. This system is described to produce a higher gear ratio within a smaller volume than is possible with planetary gears. In another illustrative known drive wheel arrangement, the components of an electric motor are fitted within the dimensions of the wheel and are driven by gearing to drive the wheel.

Gear systems used to drive motors are required to match the natural output characteristics (speed and torque) of the motors to load requirements. Optimally, electric motors naturally operate at high speed and low torque at a specific power level. Many loads, however, require high torque at low speed. Changing the gear ratio of a gear system to a higher ratio of input speed to output speed in this situation has been suggested. While a higher gear ratio may be produced by adding gear stages or by the use of a harmonic drive, these approaches lead to a reduction in gear system efficiency. It is desirable to maximize the efficiency of a gear system.

In a conventional gearbox, respective gear stages are arranged on parallel, horizontally offset axes, with one gear per axis. The axes are horizontally offset from each other by a selected distance so that the gear elements at a designated end of each axis make contact with and drive, or are driven by, each other. The sizes of the gear elements are chosen to achieve a desired ratio. For example, if an input gear element with a diameter of one inch is positioned on a parallel axis to drive an output gear element with a diameter of six inches, an advantage ratio of 6:1 will be achieved. It is, however, difficult to achieve a higher gear ratio within the space occupied by this type of gear arrangement. If a higher gear ratio can be achieved without sacrificing efficiency, the applications of gear systems can be expanded.

The art has not suggested a gear system or a gearbox with an arrangement of gear elements that effectively multiplies torque and increases the gear ratio of the system while maximizing efficiency. A need exists for such a gear system with an arrangement of gear elements that permits a motive input to drive planet gear elements in the system to increase the gear reduction ratio while maximizing efficiency of the gear system. A need further exists for an efficient gear system with an arrangement of planet gear elements driven by a motive power source that is capable of driving a vehicle wheel and moving the vehicle at desired travel speeds on a ground surface.

SUMMARY OF THE INVENTION

It is a primary object of the present invention, therefore, to provide a gear system with an arrangement of gear elements that permits a motive input to drive planet gear elements to increase the gear reduction ratio while maximizing efficiency of the gear system.

It is an another object of the present invention to provide a gear system with a wobble gear arrangement having eccentric planet gear elements designed to achieve high gear ratios in a gear reduction while maximizing efficiency of gear system operation.

It is another object of the present invention to provide a gear system designed to increase the gear ratio realized in a single stage without reducing gear system efficiency with non-collinear or off-axis gear elements that are driven as the input.

It is an additional object of the present invention to provide a gear system with a wobble gearing arrangement for a vehicle drive wheel or other application that is designed to achieve higher gear ratios within a smaller volume than is presently possible.

It is an additional object of the present invention to provide a wobble gear system with a plurality of compound planet gears designed with non-collinear axial offsets that function as cranks during operation.

It is an additional object of the present invention to provide a wobble gear system with a plurality of cranks designed to wobble at high speeds and that may be coupled to a motor rotor to permit a powerful high speed motor to provide a powerful low speed output.

It is yet an additional object of the present invention to provide a wobble gear system that produces optimal gear reduction ratios and maximizes gear system efficiency with a reduced number of components It is a further object of the present invention to provide an efficient gear system with an arrangement of planet gear elements driven by a motive power source that is capable of driving a vehicle wheel and moving the vehicle at desired travel speeds on a ground surface.

It is a further object of the present invention to provide a wobble gear system for a vehicle wheel drive motor that increases torque density.

It is yet a further object of the present invention to provide a gear system with a wobble gear element structurally integrated with components of a vehicle wheel drive system, wherein one or more components of the wheel drive system can function as a wobble element to produce optimum system gear ratios.

It is a still further object of the present invention to provide a method for multiplying and transferring torque from a motive input to a wobble element within a wobble gear system to increase gear reduction ratios without sacrificing gear system efficiency.

It is a still further object of the present invention to provide a method for multiplying and transferring torque from an aircraft landing gear wheel-mounted drive motor input to a wobble gear element in a wobble gear system to produce the torque required to drive an aircraft drive wheel on a ground surface at taxi speeds.

In accordance with the aforesaid objects, a gear system is provided with an arrangement of gear elements that permits a motive input to drive planet gear elements to increase the gear reduction ratio while maximizing efficiency of the gear system. The gear system may have wobble elements including a wobble plate and planet gear elements that are non-collinear or off-axis and may be driven by the motive input, which increases the realized gear ratio in a single stage without reducing efficiency. Embodiments of wobble gear systems are proposed that may be structurally separate from or integral with gearing components to enhance operational gear reduction ratios while reducing the number of components. One wobble gear system embodiment may employ a plurality of ring-supported and driven compound planet gear elements with laterally offset non-collinear central axes to optimize eccentricity and enhance gear reduction ratios.

The present wobble gear system may be integrated with components of a system for driving a vehicle drive wheel that is mounted within the vehicle drive wheel and is operative to drive the vehicle wheel at a desired speed and torque on a ground surface. The motor may be an electric motor with rotating and stationary components, an internal combustion engine, a hydraulic motor, or even a steam turbine. The gearbox may be a roller traction system with at least a pair of rotatable spaced races with spaced rolling elements between the races or another gearing system. The wobble gear system, which may be integral with the gearbox, may include, in one embodiment, concentric axially spaced ring elements, a plurality of compound planetary gear elements rolling against the ring elements, and/or a wobble plate that rotates eccentrically at a desired speed and/or torque to produce a desired combination of torque and speed to drive the vehicle wheel, and, therefore, the vehicle, on a ground surface. The spaced compound planetary gear elements may have a stepped structure, wherein each section of the compound structure has a central axis that is axially offset so that the axes are not collinear. The system may produce the same eccentric rotation or wobbling in selected ring elements and compound planetary gear elements as in the wobble plate during operation of the system to drive a vehicle wheel at desired torques and speeds. Other wobble gear system embodiments proposed herein may employ a combination of gears and/or crank arm structures integral with structural components of the wobble gear system or the system driving the vehicle wheel to produce the eccentric rotation that produces optimal gear ratios while maximizing gear efficiency.

It is further contemplated that rotating drive motor components may be structured and positioned to function as wobble elements to introduce wobbling during operation of the drive motor.

The present invention further provides a method for using the rotation of the planet elements as the rotation input of the wobble gear system.

Other objects and advantages will be apparent from the following description, claims, and drawings.

DESCRIPTION OF THE INVENTION

Figure 1:
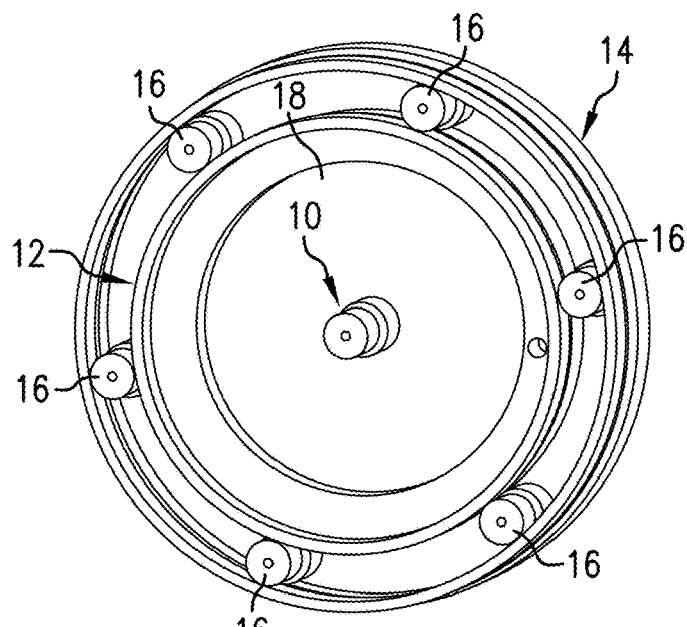
FIG. 1 is a diagrammatic representation of a partial perspective front or end view of components in one embodiment of a wobble gear system in accordance with the present invention.

A wobble gear system encompasses gearboxes in which off-axis or non-collinear intermediate gear elements operate at a higher rotational speed than either the gear system input or the gear system output. Both conventional planetary gear elements and compound or stepped planetary gear elements may operate at this higher rotational speed. In both a conventional planetary gear system and a gear system with compound planetary gears, the planet elements may rotate at a much higher speed than the conventional input, depending on the diameters of the gear elements. In both of the foregoing types of systems, an on-axis input, such as a sun gear, is driven at the input speed, and an intermediate gear element rotates at the higher speed. The output is taken from another on-axis element, such as a ring gear. The present invention employs the rotation of the planet elements of a planetary gear system as the rotational input of the system. The planet elements rotate at the highest speed of the gear system; when this rotation is used as the gear system input, greater gear ratios may be provided without reducing the overall efficiency of the gear system. When the planet elements are off-axis or non-collinear, as described below and shown in the drawings, they are driven using an eccentric or crank on each planet element, a wobble plate is caused to oscillate, cranking the planet elements and causing the planet elements to rotate. Each rotation of the input causes a single oscillation of the wobble plate, which causes a single rotation of each planet element. Since the planet elements are orbiting a central axis as well as rotating, the wobble plate must be able to rotate at low speed. This rotation of the wobble plate may increase or decrease the rotations of the planet elements by one per orbit.

The term "wobble" as used herein is intended to describe eccentric movement of components of a gear system and off-axis or non-collinear gear system elements relative to other nearly collinear gear system elements to provide gear reduction systems that have increased gear ratios. Eccentric or cycloidal movement produced in connection with a vehicle drive system or other drive system as described herein may enable the production of a high gear ratio.

The use of a wobble gear arrangement as described herein in a vehicle drive wheel or other drive system presents the potential for improving operation of the entire drive system. In the method of the present invention, a wobble element permits the prime mover to drive the planetary elements of a gear system. In planetary gear reduction systems, input and output are usually taken using concentric elements, such as sun gears, ring gears, or planet carriers. The planetary elements usually float between or roll against ring and sun gears and rotate at much higher speed than that of the concentric elements. The wobble element permits direct coupling to the planetary elements, producing a much greater gear ratio than would otherwise be possible. In the present wobble gear system, it is possible to select which structure in the system a drive motor will rotate and the speed at which this structure will be rotated or spun. Selected structures of the present wobble gear system, preferably ring structures as shown and described herein, may function as fixed, input, output, and floating system elements.

Systems that drive vehicle wheels to move a vehicle on a ground surface require integrated components capable of effectively transferring driving torque to a drive wheel. Effectively driving a vehicle wheel may require a higher torque and lower speed than that produced by a drive motor mounted to drive the wheel. An electric motor, for example, may produce a lower torque and higher speed output than is required to drive the vehicle wheel. An arrangement of gearing, with or without a clutch, may be useful in translating torque to a vehicle drive wheel. In one motor and drive system arrangement with which the wobble gear system of the present invention may be used, an electric drive motor that includes a stationary element and a rotating element may provide the requisite driving torque to a drive wheel through a gearing system that may be activated by a clutch. The integrated operation of these components should ultimately transfer sufficient torque to drive the vehicle drive wheel to move the vehicle at a desired speed during ground travel. The components of the present wobble gear system may be adapted to drive the drive wheels of a range of different kinds of vehicles, including aircraft, automobiles, and like vehicles and move these vehicles on ground surfaces.

As noted, drive motors available for driving vehicle wheels are typically not capable of the torque and speed outputs desired, and the wobble gear system of the present invention effectively produces the torque and speed required to drive a vehicle. Drive motors may operate at excessive speed and insufficient torque, and the present wobble gear system produces the desired optimal combination of speed and torque, essentially exchanging speed for torque to multiply torque and divide speed. The present wobble gear system is designed to be used in concert with a system and/or components for driving a vehicle drive wheel. This system and/or components may include a drive motor and a gearing system, including, for example, roller traction gear systems, toothed or spur gear elements, or combination gear systems with both rolling surfaces and toothed surfaces in vehicle wheel drive systems and other systems.

The drive motor serves as the input to the wobble gear system, as described herein, and transfers torque to the wheel. An aircraft, automobile, or other vehicle with wheels driven by the present wobble gear system may also be powered by another, separate, source of motive power, such as an engine. The present wobble gear system is also contemplated to be useful in other types of arrangements and systems useful for driving vehicle wheels than those described herein.

One example of a drive motor with which the present wobble gear system may be used includes a rotating element, such as a rotor, and a stationary element, such as a stator. The rotor may be located externally, as shown in the drawings, or internally of the stator. Other drive motor component arrangements may also be used effectively with the wobble gear system of the present invention. A suitable drive motor may be an electric motor assembly, such as an inside-out electric motor in which the rotor can be internal to or external to the stator, such as that shown and described in U.S. Patent Application Publication No. 2006/0273686, the entire disclosure of which is fully incorporated herein by reference. Other electric drive motors that may be useful with the present wobble gear system include high phase order electric motors of the kind described in, for example, U.S. Pat. Nos. 6,657,334; 6,838,791; 7,116,019; and 7,469,858, and the entire disclosures of the foregoing patents are fully incorporated herein by reference. Other drive motors, as noted above, including internal combustion engines, hydraulic motors, or steam turbines, may also be suitable drive motors. The drive motor selected to drive a vehicle drive wheel as described herein should be capable of moving the vehicle on a ground surface without reliance on the vehicle's main engine or main source of motive power.

Referring to the drawings, which are not drawn to scale, illustrative possible arrangements of wobble gear system components are shown. Other functionally equivalent arrangements of components are also contemplated to be within the scope of the present wobble gear system. Gear teeth are not shown on the gears depicted in the drawings. In most applications, the individual gears in the wobble gear system will have teeth on exterior circumferential surfaces designed to mesh with teeth of adjacent gears. In some applications, however, frictional forces rather than teeth may be used to produce driving contact between gears. Additionally, the eccentric element of the wobble system may be one or more rollers of a roller traction type of speed reducer, in which case the system may be referred to as a "traction wobble" system.

FIG. 1 illustrates a diagrammatic partial perspective front or end view of preferred components in one embodiment of a wobble gear system in accordance with the present invention. These structures are gears with teeth (not shown) that transmit tangential force combined with rolling contact surfaces to maintain radial spacing. Additionally, elements with gear teeth may be combined with smooth disc elements in the present wobble gear system. Alternatively, the structures could all have smooth rolling contact surfaces, as in roller traction drive systems.

The wobble gear system embodiment of FIG. 1, which is designed to work in conjunction with a source of motive power, such as the drive motor 48 (shown in FIGS. 4 and 5), may include an optional central element 10, but this central element is not required. Two sets of radially spaced rings, an inner ring set 12 positioned radially toward the central element 10 from an outer ring set 14, are spaced circumferentially outwardly of the central element 10 or a central axis 10, if there is no central element. As described below, each ring set 12 and 14 has a pair of rings, and the two rings in each ring set 12 and 14 are eccentric to each other. A selected number of planet gear elements 16 is positioned to engage or mesh with the inner and outer sets of rings 12 and 14. The specific number of planet gear elements may vary from the six planet gear elements shown in the drawings. A wobble disc element 18 may extend between the central element or central axis 10 and the inner set of rings 12. The wobble disc element 18 may be in contact with at least one of the rings in the sets of radially spaced rings. The wobble disc element may also be in indirect contact or arranged to crank one or more of the planet elements.

It will be noted from FIG. 1 that the wobble disc element 18 is concentric to one ring of the pair of rings in each inner and outer sets of rings and is eccentric with respect to the other ring in the pair of rings. The planet gear elements 16 may drive and/or be driven by selective rings in the inner and outer sets of rings. Wobble forces applied to eccentric rings 20, 22 and/or eccentric rings 26, 28 (FIG. 2) in the respective inner and outer eccentric ring sets 12, 14 are coupled to the planet elements 16, which permits an input of the drive motor 48 to couple to the rotation of the planet elements 16. This arrangement produces the greatest possible gear ratio because the planet elements 16 have the highest rotational speed compared to the other wobble gear system components.

Figure 2:
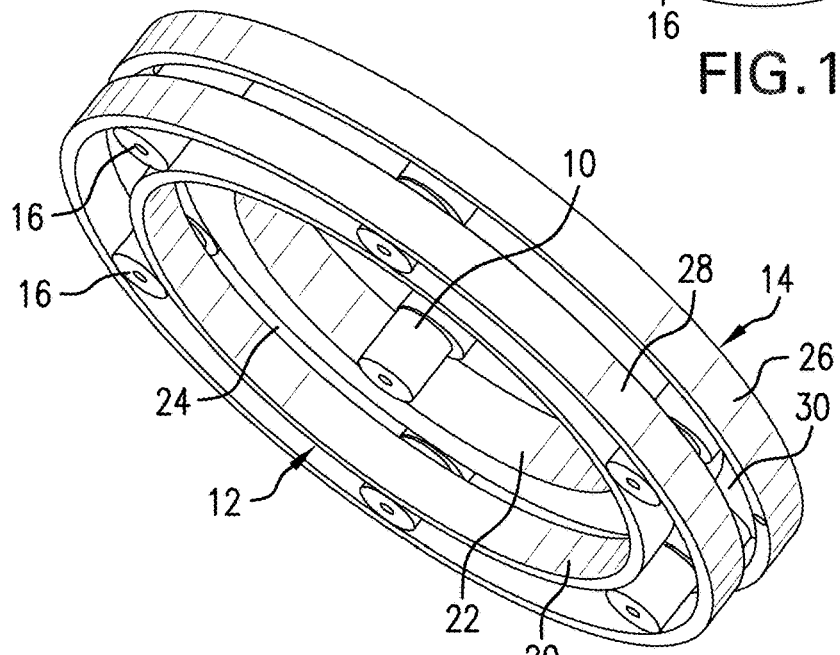
FIG. 2 shows the wobble gear system components of FIG. 1 in a diagrammatic perspective view.

FIG. 2 illustrates, in more detail, preferred configurations of the inner set of rings 12 and the outer set of rings 14. The inner set of rings 12 includes two axially spaced rings 20 and 22 separated by a gap 24. Ring 22 may have a slightly different structure than ring 20 and may preferably connect the wobble disc element 18 to the central gear element 10, if present. As noted above, rings 20 and 22 are positioned eccentrically to each other. The outer set of rings 14 includes two axially spaced rings 26 and 28 separated by a gap 30. Rings 26 and 28 are positioned eccentrically to each other. The set of outer rings 14 is preferably spaced a distance from the set of inner rings to drivingly engage or contact selected sections of the planet gear elements 16 as described below. One of the rings 20,22 and 26,28 in each set will be concentric to the wobble disc element 18, and the other of the rings 20,22 and 26, 28 in each set will be eccentric to the wobble disc element 18. The planet gear element-contacting surfaces of the inner and outer rings, like the gear elements themselves, may or may not be provided with teeth, depending on whether a meshing or frictional contact is desired.

Figure 3:
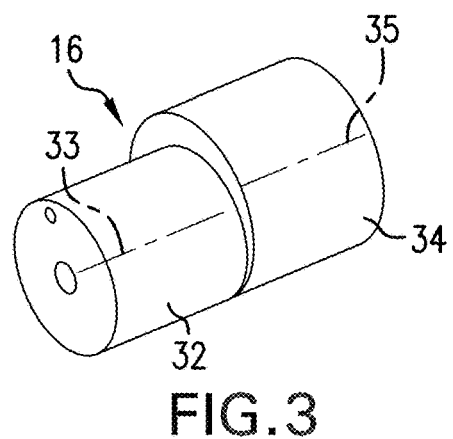
FIG. 3 illustrates, in perspective view, a compound planet gear element in accordance with the present invention, showing the non-collinear, laterally offset axes of adjacent compound planet gear portions.

FIG. 3 shows a perspective view of a preferred planet gear element design for the present wobble gear system. The planet gear elements 16 may have this configuration. If a central element 10 is included in the system, this configuration may be used for the central element. Other functionally equivalent gear element configurations are also contemplated to be within the scope of the present invention. To illustrate, each planet gear element 16 is a compound or stepped gear element that may include two gear sections 32 and 34. One gear section may have a smaller diameter than the other gear section. As shown, gear section 32 has a smaller diameter than gear section 34. Additionally, the central axes of gear sections 32 and 34 are not collinear, but are offset to be off-axis and non-collinear. As a result, the central axis 33 of gear section 32 is not aligned with the central axis 35 of gear section 34; rather, the axes are offset by a selected radial or lateral distance that causes the planet gear elements 16 to produce eccentric rotation of structures driven by these gear elements. While the specific radial or lateral distance by which the gear sections 32 and 34 are offset may not significantly affect function of the planet gear element 16, an offset distance of about 6.0 millimeters to about 10.0 millimeters (mm) between the center of axis 33 and the center of axis 35 has been found to achieve acceptable eccentric rotation in one application. Generally, the larger the radial offset distance between the planet gear element section axes, the lower the linear forces needed to transmit a given torque will be. Other offset distances may be required in other applications and are contemplated to be within the scope of the present invention. In a given system, all of the eccentric elements must have the same radial or lateral offset for the system to function effectively without jamming. If a central element 10 is included, this element should have the same radial or lateral offset as the planet gear elements 16 so that the axes are non-collinear to the same extent.

The difference in the radial or lateral offset between central axes of the gear sections in the compound planet gear elements of the present wobble gear system enables these gear elements to be driven eccentrically without a separate physical crank mechanism, which is discussed below in connection with FIGS. 6-8. The offset between the gear sections in these compound gears not only may function as a crank, but also may eliminate the requirement for a bearing around a crank structure, therefore reducing components required for the wobble gear system.

Each of the rings in the inner and outer sets of rings may be designated to have a specific function during operation of the present wobble gear system. One ring may be an input ring, one ring may be an output ring, one ring may be a fixed or stationary ring, and one ring may be a floating ring. Preferably, one ring 20 or 22 of the inner set of rings 12 functions as a fixed ring and the other ring 20 or 22 functions as an output ring. One ring 26 or 28 of the outer set of rings 14 may function as an input ring, and the other ring 26 or 28 may function as a floating ring. If desired, one ring of the outer set of rings 14 may be eliminated. At least one ring should be retained in contact with the planet gear elements 16, however.

The inner and outer sets of rings 12 and 14 are preferably sized and positioned to contact and mesh with respective gear sections 32 and 34 of the compound planet gear elements 16. It is noted from the drawings, and FIG. 3 in particular, that the relative diameters of the offset gear sections 32 and 34 may be slightly different and that the axial offset of the gear sections may cause a portion of the outer circumference of both gear sections to be aligned. The rings 20 and 22 in the inner set of rings 12 may be positioned relative to the planet gear elements 16 so that each inner ring contacts a gear section 32 or a gear section 34. Likewise, the rings 26 and 28 in the outer set of rings 14 may be positioned relative to the planet gear elements 16 so that each outer ring also contacts a gear section 32 or 34. The positions of each ring of the inner set or the outer set of rings in contact with a planet gear element gear section (32, 34) determines the size of the respective axial gap 24 between the inner rings 20, 22 and axial gap 30 between outer rings 28, 30.

During operation of the present wobble gear system, it is possible to select which component of the wobble gear system may be caused to rotate or spin and the speed at which rotation will occur. When the central element 10 is included and driven, this element may be used as a dummy to push an output ring 20 or 22 in wobbling fashion. The compound planet gear elements 16 are caused to rotate in the same manner as when an outer ring 26 or 28 is rotated. In a conventional system, when a driven ring rotates, the revolutions per minute (RPM) of the planet gear elements 16 may be greater than the RPM of the drive system. In the present wobble gear system, when a drive system drives the planet gear elements 16, these elements will rotate at the speed of the input, which is always faster than the RPM of the outer ring 26 or the outer ring 28.

To illustrate gear reduction ratios possible with the wobble gear system of the present invention, when the planet gear elements 16 each have a constant diameter of about 1.0 inch, and the diameter of the fixed ring 20 or 22 is about 10 inches, a 40:1 gear reduction. Different gear reductions may be achieved with different sizes of planet gear elements and fixed rings to enhance gear reductions.

In another embodiment of the present wobble gear system, the compound planet gear elements 16 have sections 32 and 34 with two different diameters, and a pair of concentric gear elements, which may be ring gears or sun gears (not shown), are in contact with the planet gear elements 16. Since the sections 32 and 34 of the planet gear elements 16 are eccentric, one of the two ring or sun gears is rendered eccentric to the other. This creates a crank element and causes one ring or sun gear to oscillate or wobble as the planet elements rotate and to become a wobble plate. The planet elements of the planetary gear system are driven to rotate at the speed of oscillation, which increases the gear ratio without decreasing efficiency. As a result, input is provided not by rotating a concentric gear, but, instead, by oscillating it from side to side, which greatly increases gear ratio without adding additional elements to the wobble gear system.

Figure 4:
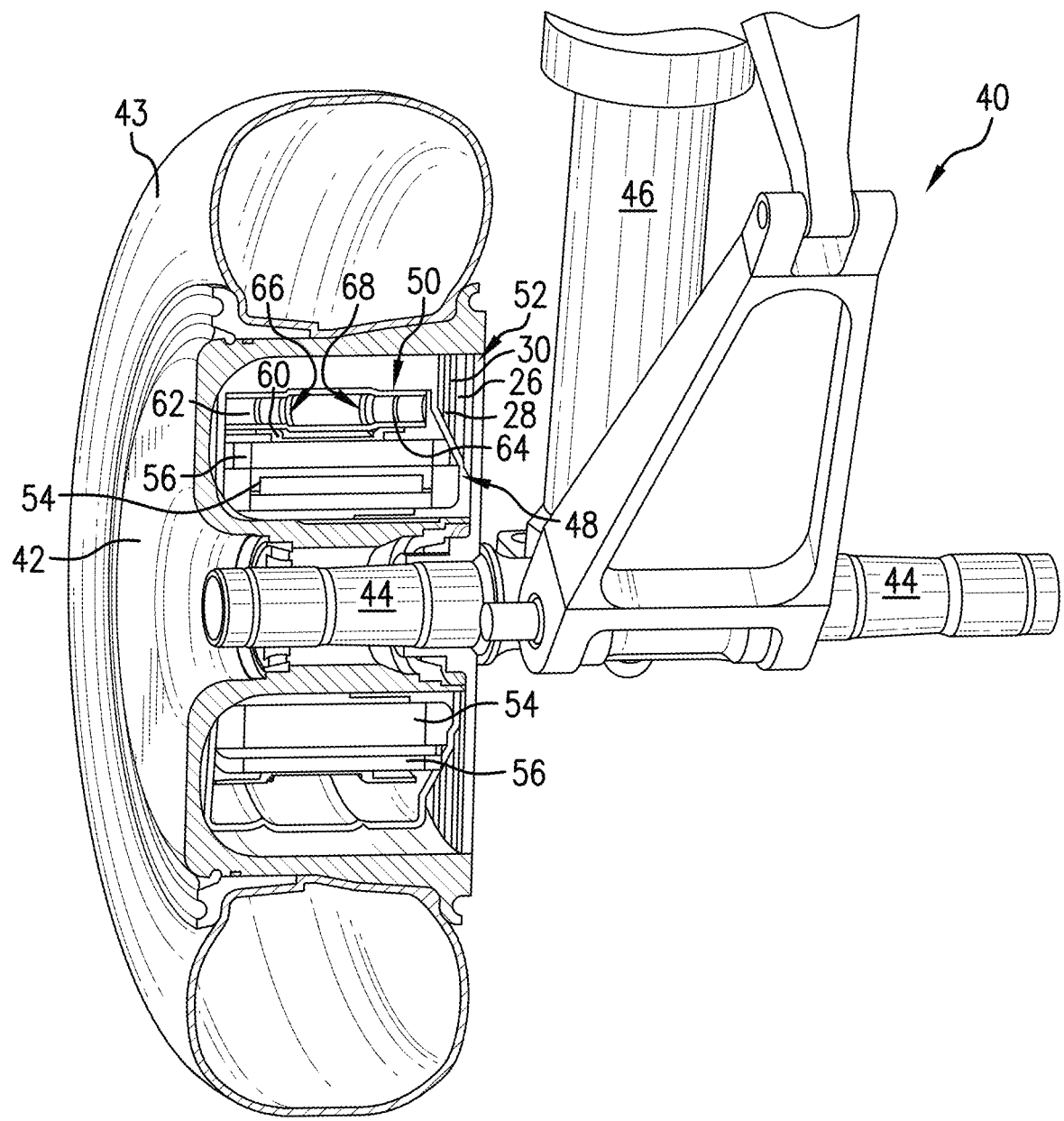
FIG. 4 is a partially cut away perspective view of an aircraft landing gear wheel with a drive motor, a drive system, and a wobble gear system in accordance with the present invention.

In a modification of the foregoing embodiment, a crank element may be created by offsetting the sections 32 and 34 of the planet elements 16 as shown in FIG. 3 so that these sections are non-collinear and off-axis. The FIG. 4 illustrates, in partial cross-section view, an aircraft landing gear wheel that functions as a drive wheel to drive an aircraft during ground travel. The present wobble gear system may be used effectively to enhance operation of the landing gear wheel drive system shown and discussed in connection with FIGS. 4 and 5. While an aircraft drive wheel is shown and described, it is understood that the components of the present wobble gear system may also be designed to enhance a drive system to drive a wheel of virtually any kind of vehicle that can be driven by one or more drive wheels on a ground surface. The aircraft landing gear 40 shown in FIG. 4 may be a nose landing gear or a main landing gear. Typically a pair of wheels 42 with tires 43, only one of which is shown, are mounted on axles 44 connected to a strut 46 and other known landing gear structures (not identified) that permit the wheels to be retracted and extended. The drive wheels of automobiles and other vehicles with which the present wobble gear system may be used are, in comparison, less complex structures, which may simplify the use of the present wobble gear system to enhance a drive system driving wheels of these vehicles. Although only one aircraft landing gear wheel is shown in detail, it is contemplated that one or more nose landing gear wheels, one or more main landing gear wheels, or a combination of nose and main landing gear wheels could be equipped with drive wheel drive systems that have wobble gear systems and roller traction or other drive systems as described herein.

Figure 5:
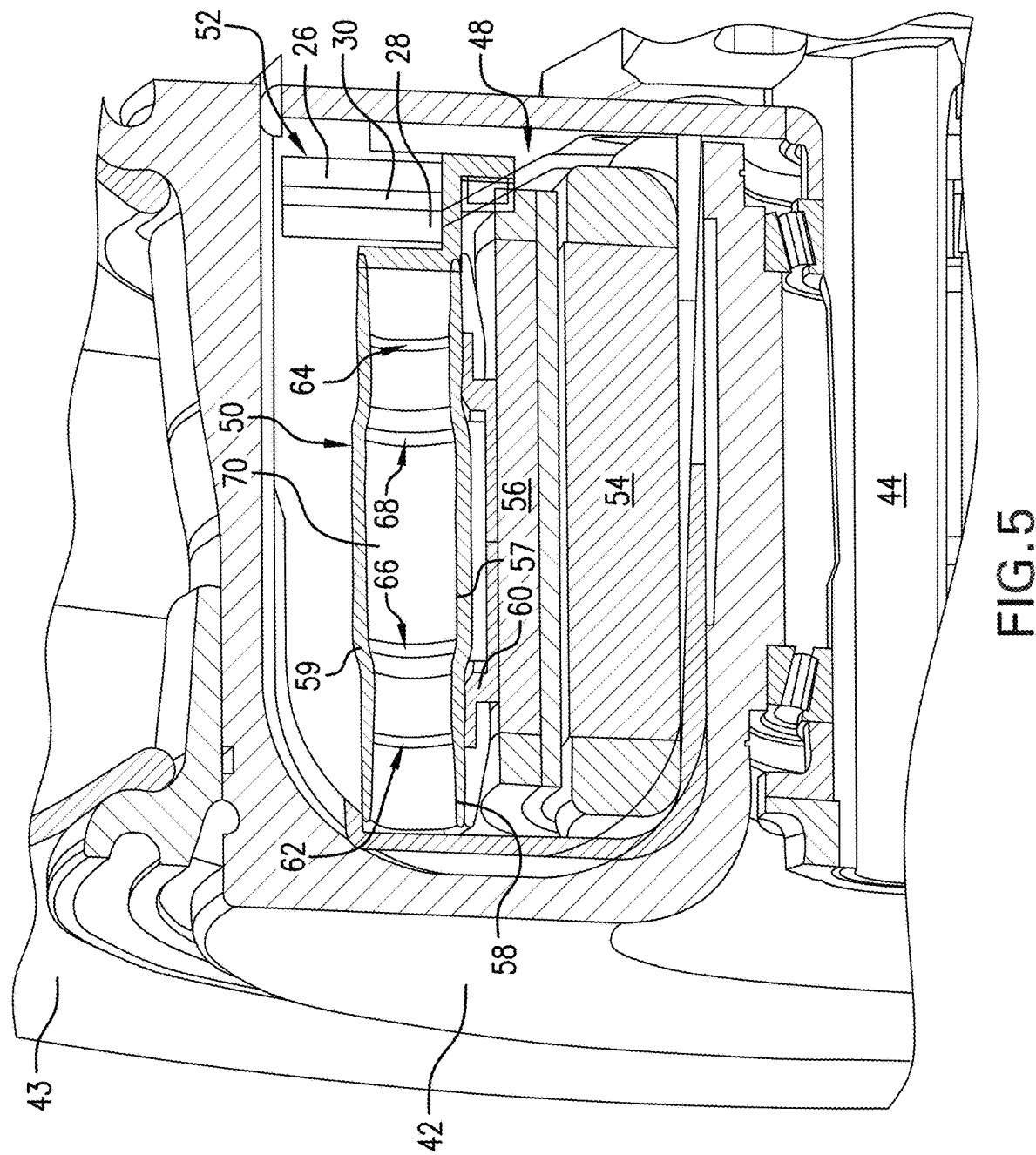
FIG. 5 is an enlarged view of a portion of the aircraft landing gear wheel of FIG. 4, showing the drive motor, drive system and wobble gear system.

Drive wheel drive system components may be and are preferably contained completely within the dimensions of the aircraft wheel 42, as shown in FIGS. 4 and 5 and may be in other locations, depending on the vehicle. The drive system may include a non-engine drive motor 48 and a roller traction system 50, or a gear system 52. The present wobble gear system may replace either the roller traction system 50 or the gear system 52; two potential locations are shown. The foregoing components are mounted circumferentially around the axle 44. The drive system is not shown near the lower extent of the drawing so that a drive system housing may be seen more clearly. The drive motor 48 may include a stator 54 and a rotor 56 and may be any of the types of drive motors described above.

When the roller traction system 50 is adapted be used as a wobble gear system, the roller traction system may include at least a pair of circumferentially spaced circular races with a number of roller elements in the space between an inner race and an outer race. When one of the races is wobbled and the planets are eccentrically related as described above, the rollers spin at a speed related to the wobbling. The inner race may spin at a speed that is much lower than the wobble speed. The rollers within the roller traction system, as referred to above and described below, may be used as crank elements in connection with the wobble gearing described herein.

When a gear system 52 is adapted to be used as a wobble gear system for the aircraft drive wheel drive system, the wobble gear system components described in connection with FIGS. 1-3 may be located in an inboard portion of the aircraft wheel as shown, or they may be located where the roller traction system is shown to be positioned within the aircraft drive wheel in FIGS. 4 and 5.

FIG. 5 is an enlarged view of the portion of the aircraft drive wheel 42 that is above the axle 44, as shown in FIG. 4. The roller traction system 50 may be enclosed in an outer housing structure 58, referred to as a roller box. The roller box 58 supports pairs of races, which hold roller elements in optimum positions between interior and exterior races in a pair of races. One side 57 of the roller box is oriented toward the drive motor rotor 56 and is in driving contact with the drive motor through a coupling 60. The outer rings 26 and 28 and the gap 30 of the FIGS. 1 and 2 wobble gear arrangement 52 are also shown in FIG. 5.

In the description of the present invention, the terms interior and exterior are used to describe the position of a race relative to an axis of rotation of the races, and the terms central and side are used to describe positions of races relative to the axial length of the roller box 58. The arrangement of races in the roller box 58 shown in FIGS. 4 and 5 includes four types of races: exterior races 62, 64, 66, and 68; races interior to these races that are not visible; large diameter races 66 and 68, and small diameter races 62 and 64. Interior races are conventionally spaced circumferentially inwardly of exterior races and have roller elements located between the interior and exterior races. In one roller traction system design, when one of the races moves, all of the other races also move, and when movement of a race is stopped, the movement of all other races, and therefore movement of the roller traction system, is constrained. One race may function as an input at high speed and as an output at low speed. When one race functions as a "floating" race, it is permitted to spin in whatever direction it must go; when it is stopped, the roller traction drive system is constrained. Both exterior side races 62 and 64 may be floating, which may help to tie the side races together. The movement of the races may be coupled to positions of the rollers within the races, which are not visible in FIGS. 4 and 5.

A gear speed reducer, such as the roller traction system 50, has an input torque, an output torque, and a reaction torque. The sum of these three torques must be zero, and torque must balance. The drive motor 48 produces very low torque, and the output of a gearing system is high torque; therefore, the reaction torque is also very high. Any speed changing system needs a reaction torque takeout element, and at least one stationary element of the roller traction or one element of the wobble gear system may be designed to function as a reaction torque takeout element. For example, one of the exterior races 62, 64, 66, 68 or interior races not visible in the drawings could be used as a reaction torque takeout element. One of the rings 20,22, 26, 28 in contact with the planet gear elements 16 could also be used as a reaction torque takeout element.

When the reaction torque takeout element is stopped and/or held in a stopped condition, torque transfer through the present wobble gear system is permitted. The reaction torque takeout element must be stationary or must be stopped to permit torque transfer from input to output. When two or more elements of the wobble gear system are stopped, the gearbox is blocked from rotating, and the system is locked and prevented from moving. Although torque is not transmitted from the motor to the wobble gear system in this situation, stationary torque is developed and can stop the system from spinning. When neither the reaction torque takeout element nor any other system elements are blocked or otherwise stopped from rotating freely, the system will spin freely, and no torque will be transferred through the system, for example during situations when torque should not be transferred to the drive wheel or to other system components.

Figure 6:
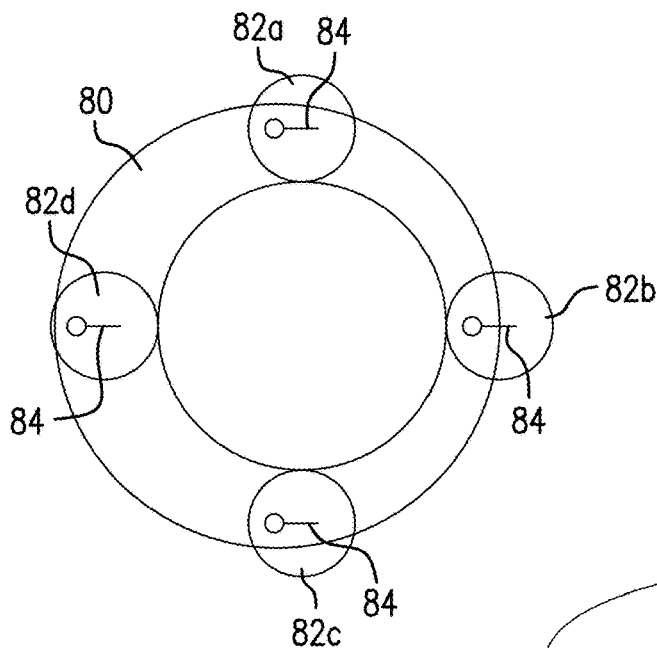
FIG. 6 is a diagrammatic illustration of another embodiment of a wobble gear system in accordance with the present invention.
Figure 7:
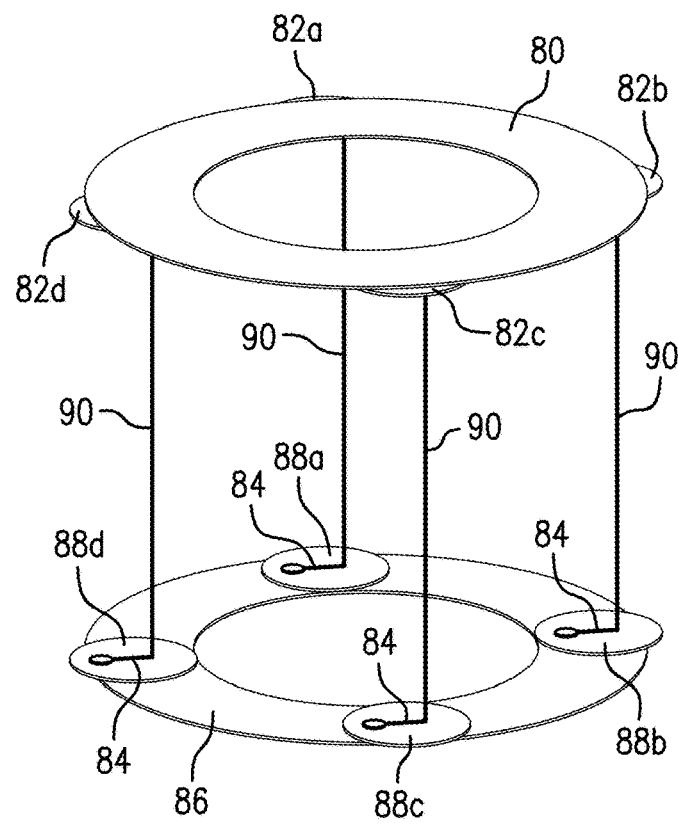
FIG. 7 is a diagrammatic illustration of an additional embodiment of a wobble gear system in accordance with the present invention.

Another embodiment of a wobble gear system useful for driving a roller traction drive is shown diagrammatically in FIGS. 6 and 7. The embodiments shown in these drawings and in FIG. 8 employ a wobbling/crank system that is a mechanism for applying rotational input to one of the rotating elements in the wobble gear system. If a system element is supported with a crank, it can be constrained and prevented from rotation, even as it wobbles. This permits a single element to function as a wobble element for crank input and, simultaneously, as a stationary torque takeout for rotation. In this embodiment, a plate 80 is attached to small gears 82*a*, 82*b*, 82*c*, and 82*d*, which may be spur gears or the like. These gears may have external teeth (not shown) that may meshingly engage teeth of other gears in a gear train, if desired. Although four gears 82*a*-82*d* are shown, this is not meant to be limiting, and any functionally useful number of gears may be supported on plate 80. The plate 80 is functionally similar to a handle or a pedal on a bicycle. The plate 80 may be attached to a crank or handle (not shown) and may be rotated to move the gears 82*a*-82*d*. A small crank arm 84 may be attached to each of the gears 82*a*-82*d* in a position eccentric to a center of the gear as shown. The position of the plate 80 may be maneuvered to rotate the gears 82*a*-82*d* in a selected direction 90° from a starting position.

The gears 82*a*-82*d* represent planet gear elements, and the crank elements 84 are eccentric to the axis of rotation of the planet gear elements. Each of the planet gear elements 82*a*-82*d* have an eccentric crank element with the same offset. The offset may be clocked as necessary to ensure that the offset is in the same direction for all of the planet gear elements. The crank elements may be connected to plate 80, which functions as a wobble plate, by bearings (not shown), which permit free rotation of the plate 80. As the planet elements 82*a*-82*d* rotate, the wobble plate 80 follows, oscillating as the eccentric crank elements 84 rotate. By pushing the wobble plate 80 to oscillate, the planet elements may be pushed to rotate. Therefore, when the wobble plate is driven to oscillate, the crank elements are pushed, and the planet elements are caused to rotate. The wobble plate 80 simultaneously oscillates about a concentric axis due to the eccentric crank connection and rotates about the concentric axis as a planet carrier. Consequently, the wobble plate 80 may simultaneously provide both input and output in a planetary gear system with this arrangement.

FIG. 7 illustrates, diagrammatically, another arrangement of the wobble gear components shown in FIG. 6, in which two plates 80 and 86 are spaced axially. Each plate 80 and 86 is shown supporting four gears, although, as noted above, other numbers of gears may be used. Gears 82*a*-82*d* are supported on plate 80, and gears 88*a*-88*d* are supported on plate 86. Each of the gears has a crank arm 84 mounted eccentrically to the center of the gear as shown in FIG. 6. A crank attachment element 90 is attached at one end to each crank arm 84 mounted on a gear 82*a*-82*d* on plate 80 and at an opposite end to a crank arm 84 on a corresponding gear 88*a*-88*d*. Plate 80 may be wobbled to follow a circular path and cause the gears 82*a*-82*d* to rotate. The rotation of gears 82*a*-82*d* may be transmitted through the crank attachment elements 90 to corresponding gears 88*a*-88*d*, causing them to rotate and plate 86 to rotate in response to the wobbling motion of plate 80. Plate 86 may also be caused to wobble as describe above in connection with FIG. 6.

Figure 8:
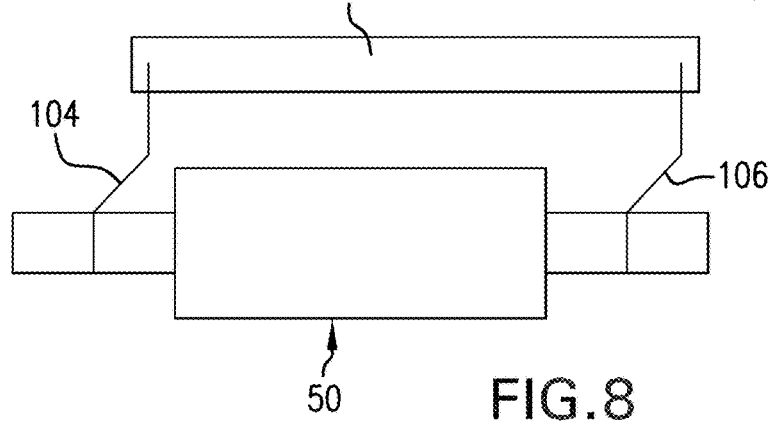
FIG. 8 illustrates schematically components of a further embodiment of a wobble gear system connected to a roller traction type of gearbox.

FIG. 8 is a schematic illustration of an additional embodiment of a wobble gear system with a wobble element 100 in a roller traction system 50, described above in connection with FIGS. 4 and 5. Opposed crank elements 104 and 106 may be provided to attach the wobble element 100 to an appropriate component of the roller traction system 50. As described above, a roller traction system 50 may include one or more pairs of races (FIGS. 4 and 5) spaced apart to support a plurality of rollers between each pair of races. In a pair of races, typically one race (usually an inner race) spins freely and the other race (usually an outer race) is fixed, while the roller bearings or elements spin freely. If there is more than one pair of races in a roller traction drive and an outer race of one pair is wobbled or moved eccentrically, an inner race of another pair may spin at the wobbling speed or at a slower speed. When a small sized gear, such as one or more of the gears 82*a*-82*d* or 88*a*-88*d* in FIG. 7, is spun at the ratio produced by this arrangement, an output connected to the gear may spin slowly at high torque.

Variations of connections between a wobble gear or wobble element, such as wobble element 100 and the races and other structures in and associated with the roller box 58

(FIG. 5) are possible. For example, a central portion 70 of the roller box 58 may function as a high speed input. The exterior side races 62 and 64 may be held stationary, race 66 may function as a low speed output, and race 68 may function as a floating race. When the roller box 58 is connected to a crank or to multiple cranks, such as crank elements 104 and 106, the central race 70 of the roller box may be eccentric and coaxial with respect to the side races 62 and 64. If this arrangement is changed so that the central race 70 and the side races 62 and 64 are not coaxial, causing the central race 70 to wobble may cause rollers in the race 70 to rotate.

Currently, the drive motor 48, through the drive connection 60 with the roller box 58, causes the central race 70 to rotate and rollers within the race (not shown) to rotate, which, in turn, causes other races to rotate. In a wobble gear arrangement in accordance with the present invention, the roller box 58 may driven in a different way. The eccentric race 70 wobbles, which causes rollers to rotate directly by a wobble crank effect. The other races 62, 64, 66, and 68 in the roller box move in appropriate relationship to the eccentric race 70, thereby driving the roller box 58.

Since a wobbling disc element, like wobble gear element 100, does not rotate, a stationary element is still required to drive the roller box. A disc that is wobbling may not be rotating, but may be rotationally stationary. Constraining a wobbling disc element so that it may wobble without rotation permits the wobble element 100 to function as a torque takeout element. Alternatively, since wobbling is separate from rotation, the wobbling element may be a freely rotating rotational element, such as a low speed rotational output or other rotational element. In this arrangement, the wobbling element is wobbling at high speed and may be caused to rotate slowly with high torque.

In a roller traction system, a stationary element may be a race in the roller box (e.g., exterior races 62, 64, 66, or 68) or an axis of rotation of the rollers in the races. In the roller box of FIGS. 4 and 5, as noted, when the rotor 56 is the input driving the eccentric central race 70, the race 70 may wobble, but not rotate. In this situation, one of the non-eccentric races, such as races 62, 64, 66, or 68, must be constrained from not wobbling, which may be done by providing an appropriate set of bearings (not shown) that are preferably high speed bearings. If an interior central race (not shown) is prevented from rotating, it may be able to wobble. An interior side race, such as a race interior to race 62 or race 64 (not shown), may be preventing from wobbling by a bearing, but may be permitted to rotate. Interior side races, such as those races interior to races 62 and 64, will rotate slowly in this case and may be used to function as gearing. High speed wobbling in interior races may produce slow rotation in side races. Any of the described concentric elements that are fixed in place may provide torque takeout. In addition, a wobble element that is constrained to wobble, but does not rotate, may function as a toque takeout.

Yet an additional embodiment of the wobble gear of the present invention may employ two floating ring structures, for example the outer rings 26 and 28 shown in FIGS. 1 and 2. Input torque may be provided by wobbling one of the inner rings (20), and output torque may be provided by the rotation of the other inner ring (22). Torque takeout may be provided by constraining the input ring 20 to wobble without rotating. The two outer rings 26 and 28 are not connected to the input or to the output; the function of these rings is to hold the planet gear elements 16 in contact with the inner rings 20 and 22, and, therefore, they are described as floating rings.

It is assumed that there is friction that causes rollers stick to races in a roller box, such as the roller box described above. If rotation is not constrained and a fixed ring is allowed to rotate, the components of a drive wheel are essentially tied together so that the rotor 56 rotates at the speed of the wheel 42. A 30:1 gear ratio may be changed to a 1:1 gear ratio. The operation of a brake on the stationary element or stator 54 may effectively turn on or off a high gear ratio, thereby performing the function of a clutch and obviating the need for a separate clutch. A suitable brake for this purpose may be whatever structure may be used to selectively permit the rotor 56 and a central inner race (not shown) of a roller traction drive to rotate.

While the present invention has been described with respect to preferred embodiments, this is not intended to be limiting, and other arrangements and structures that perform the required functions are contemplated to be within the scope of the present invention.

INDUSTRIAL APPLICABILITY

The present wobble gear system will find its primary applicability where it is desired to maximize efficiency and multiply torque in a single stage gear system and to enhance operation of a gear system or a roller traction system in a vehicle drive wheel drive system to efficiently control movement of and drive vehicles, such as aircraft, automobiles, and the like, on a ground travel surface without reliance on vehicle main engines to supply motive power. Other non-vehicle applications of the present wobble gear system where system capable of achieving efficient gear reduction ratios is desired are also contemplated.

The invention claimed is:

1. A wobble gear system arranged to produce an optimal gear reduction ratio while maximizing gear system efficiency, comprising:
    a gearbox with a plurality of gear elements positioned to rotate about a gearbox central axis, comprising at least a plurality of spaced rings, a plurality of planet elements in contact with said plurality of spaced rings, and a wobble element in direct contact with at least one of said plurality of spaced rings and in indirect contact with said plurality of planet elements;
    said plurality of spaced rings being arranged to rotate concentrically or eccentrically relative to said gearbox central axis and said wobble element;
    said plurality of planet elements each comprising two adjacent gear sections, each of said adjacent gear sections having identical diameters or each of said adjacent gear sections having a different diameter, wherein a central axis of one said adjacent gear section is radially offset from a central axis of the other adjacent gear section so that said central axes are non-collinear; and
    said a rotational gear system input comprising a source of driving power in contact with at least one of said plurality of planet elements to cause said plurality of planet elements to rotate, and an output comprising at least one of said plurality of spaced rings.

2. The system of claim 1, wherein said plurality of spaced rings comprises a first set of axially spaced rings positioned radially outwardly of said gearbox central axis and said wobble element and axially outwardly of a second set of axially spaced rings, and a selected number of said plurality of planet elements are located in supporting and driving contact between said first set of axially spaced rings and said second set of axially spaced rings.

3. The system of claim 2, wherein said wobble element is positioned to contact said second set of axially spaced rings.

4. The system of claim 1, wherein a distance whereby said central axis of said one adjacent gear section is radially offset from said central axis of said other adjacent gear section is the same for each of said plurality of planet elements.

5. The system of claim 2, wherein each set of said first and second set of axially spaced rings comprises two rings separated by an axial gap, and wherein one of each of said two rings contacts one of said adjacent gear sections of each of said plurality of planet elements located between said first and second set of rings and the other of said rings contacts the other of said adjacent gear sections of each of said plurality of planet elements.

6. The system of claim 3, wherein said wobble disc is positioned to crank one or more of said plurality of planet elements.

7. The system of claim 1, wherein said plurality of spaced rings are arranged to rotate eccentrically relative to said wobble element.

8. The system of claim 1, wherein said input source of driving power comprises a non-engine source of motive power located in an aircraft powered drive wheel.

9. The system of claim 1, wherein said input source of driving power comprises a source of motive power located in an automobile.

10. The system of claim 1, wherein said plurality of planet elements in contact with said plurality of axially spaced rings, and said wobble element in contact with said at least one of said plurality of spaced rings are in meshing contact through toothed surfaces or are in frictional contact through smooth surfaces.

11. The system of claim 8, wherein said wobble gear system and said non-engine source of motive power are mounted completely within walls of one or more aircraft nose or main landing gear wheels.

12. The system of claim 1, wherein said wobble plate supports a plurality of circumferentially spaced toothed gears, and each said gear includes an eccentrically positioned crank element.

13. The system of claim 12, further comprising a second wobble plate spaced longitudinally from said wobble plate, wherein said crank elements on gears on said wobble plate are connected to crank elements on gears on said second wobble plate.

14. A method for transferring torque through a wobble gear system to produce an optimal gear reduction ratio while maximizing gear system efficiency, comprising:
providing the wobble gear system with a plurality of gear elements comprising at least a plurality of axially spaced rings, a plurality of planet elements spaced circumferentially about and in contact with said plurality of axially spaced rings, and a wobble element in contact with at least one of said plurality of axially spaced rings, wherein said plurality of gear elements are positioned to rotate about a central axis, said plurality of axially spaced rings rotates concentrically or eccentrically relative to said wobble element, and said plurality of planet elements comprise stepped compound planet elements with an axis of a first stepped section radially offset from an axis of a second stepped section so that the first and second stepped sections are non-collinear;
providing an input comprising a source of motive power in contact with at least one of said plurality of planet elements to produce a rotational input and providing an output comprising one of said plurality of axially spaced rings;
applying the input to the at least on one of the plurality of planet elements and causing the planet elements, the plurality of axially spaced ring elements, and the wobble element to rotate, producing eccentric rotation of at least one of said plurality of spaced rings and said wobble element so that a single rotation of the input causes a single oscillation of the wobble element and a single rotation of each of said plurality of planet elements; and
wherein said plurality of planet elements rotate at a higher speed than the wobble element or the axially spaced rings, thereby reducing a gear ratio for the wobble gear system while transferring torque through the plurality of gear elements during the eccentric rotation to the output.

15. The method of claim 14, further comprising causing a different one of said plurality of axially spaced rings to rotate concentrically about the central axis while the one of said plurality of axially spaced rings is rotating eccentrically.

16. The system of claim 4, wherein said distance whereby said central axis of said one planet element is radially offset from said central axis of said adjacent planet element comprises about 6.0 millimeters to about 10.00 millimeters.

17. The system of claim 4, wherein one or more of said plurality of axially spaced rings are arranged to rotate eccentrically relative to said wobble element and a distance said one or more eccentrically rotating spaced rings are offset from said central axis is the same as said distance said central axis of said one adjacent gear section is radially offset from said central axis of said other adjacent gear section.

18. The method of claim 14, further comprising causing the wobble element to rotate at a speed that increases or decreases a rotation of said plurality of planet elements by one rotation per orbit of the wobble element.

19. The method of claim 14, further comprising providing a plurality of crank elements eccentric to an axis of rotation of the plurality of planet elements connected to a wobble plate, causing the wobble plate to oscillate as the plurality of planet elements rotate and the eccentric crank elements to rotate so that the wobble plate simultaneously oscillates about a concentric axis and rotates about the concentric axis and is simultaneously both an input and an output.

20. A method for transferring torque through a wobble gear system to produce an optimal gear reduction ratio to drive a vehicle wheel, comprising:
providing the wobble gear system in the vehicle wheel comprising a roller traction system in a roller box with one or more pairs of axially spaced races with roller elements therebetween along a longitudinal extent of the roller box so that an inner central circumferential portion of the roller box functions as a high speed input, outer side races are held stationary, an outer central section of said inner central circumferential portion functions as a low speed output, and inner side races are floating during torque transfer;
providing a wobble element and one or more cranks attaching the wobble element to the roller traction system; and
transferring torque through the roller traction system when a drive motor transfers torque to the high speed input, causing an outer race of one of the one or more pairs of races to wobble and move eccentrically and an inner race of another of the one or more pairs of races to spin at a wobbling speed or at a slower speed, further causing said inner circumferential portion to spin at a speed that transfers an optimal torque to the vehicle drive wheel.

* * * * *